United States Patent [19]

Murphy

[11] Patent Number: 4,518,426
[45] Date of Patent: May 21, 1985

[54] PROCESS FOR ELECTROLYTIC RECOVERY OF TITANIUM METAL SPONGE FROM ITS ORE

[75] Inventor: Andrew H. Murphy, Naples, Fla.

[73] Assignee: Metals Production Research, Inc., Media, Pa.

[21] Appl. No.: 608,433

[22] Filed: May 9, 1984

Related U.S. Application Data

[62] Division of Ser. No. 483,502, Apr. 11, 1983, Pat. No. 4,487,677.

[51] Int. Cl.³ .................. C22B 34/12; C01G 23/02; C25C 3/28/3/04
[52] U.S. Cl. .................................... 75/112; 75/121; 423/69; 204/64 T; 204/70
[58] Field of Search .............. 423/79, 72, 85, 69; 75/1 T, 84.5, 121; 204/64 T, 70, 246, 247

[56] References Cited

U.S. PATENT DOCUMENTS

| | | | |
|---|---|---|---|
| 2,486,912 | 11/1949 | Belchetz | 423/79 |
| 2,789,943 | 4/1957 | Kittelberger | 204/247 X |
| 2,830,940 | 4/1958 | Hood | 204/246 X |
| 2,858,189 | 10/1958 | Globus | 75/1 T X |
| 2,880,156 | 3/1959 | Benner et al. | 204/64 T X |
| 2,943,032 | 6/1960 | Benner | 204/247 X |
| 2,951,021 | 8/1960 | Pietro | 204/247 X |
| 3,021,268 | 2/1962 | Egami | 204/64 T |

Primary Examiner—Donald R. Valentine
Attorney, Agent, or Firm—Silverman, Cass & Singer, Ltd.

[57] ABSTRACT

A process for producing titanium metal sponge within a closed cell system involving the electrical decomposition of molten magnesium chloride into magnesium metal and chlorine gas within a closed cell to form said magnesium metal as a molten layer upon said magnesium chloride; terminating said electrolytic decomposition, and subsequently; directly contacting titanium tetrachloride with said layer of magnesium metal for effecting a reduction reaction therebetween within the same closed cell to form titanium metal sponge and magnesium chloride and removing said titanium metal sponge from said closed cell. The chlorine gas by-product can be used to form titanium tetrachloride from a titanium ore/coke mixture.

10 Claims, 14 Drawing Figures

PROCESS FOR ELECTROLYTIC RECOVERY OF TITANIUM METAL SPONGE FROM ITS ORE

This application is a division, of application Ser. No. 483,502, filed Apr. 11, 1983, now U.S. Pat. No. 4,487,677.

BACKGROUND OF THE INVENTION

This invention relates generally to processes for recovering substantially pure titanium metal sponge from rutile ore and more particularly, provides a single vessel self-replenishing electrolytic process and apparatus for obtaining substantially pure titanium metal sponge.

Most titanium metal has been produced from its ores by the chlorination of its oxide-like rutile ore; the separation and purification of the $TiCl_4$ produced; the reduction of the $TiCl_4$ to titanium metal by use of an active metal such as magnesium, sodium or calcium and electrolytically recovering the reducing metal and chlorine, both for recycling.

Another well known reduction process for obtaining titanium metal from its ore is the Kroll process represented by U.S. Pat. No. 2,205,854.

The Kroll process involves the reaction of the titanium tetrachloride with molten magnesium metal in an inert gas atmosphere at normal or atmospheric pressure. A refractory metal is employed as a lining for the steel reaction vessel or crucible, the refractory metal being oxidized to prevent diffusion of the lining into the steel. The magnesium metal is heated to 800° C. and titanium tetrachloride dripped onto the metal. The product is solid titanium metal and liquid magnesium chloride. Separation of the metal requires further tedious and expensive processing.

Winter Pat. No. 2,890,112 discloses another method for producing titanium metal by reduction of the tetrachloride wherein both the magnesium and chlorine are recovered and recycled. Winter suggests the use of sodium metal produced by electrolysis of a ternary salt along with a molten calcium-magnesium alloy and chlorine gas. The chlorine gas is reacted with a titanium ore/coke mixture. The reduction reactive does not employ magnesium alone. A process involving molten sodium often is dangerous and expensive.

Glasser et al Pat. No. 2,618,549 provides a method for production of elemental titanium from its ores by reduction of a titanium halide such as titanium tetrachloride by means of an alkali metal amalgam such as is produced in mercury-amalgam chlorine cells used in the production of caustic soda. Chlorine produced in the electrolysis is employed to produce the titanium tetrachloride from the oxide ore.

The amalgam reactant is separated after its production and added to a reaction vessel along with the titanium tetrachloride. The reduction reaction is carried out in the presence of an inert gas and with vigorous agitation of the reactants. When the reaction is completed, the product is transferred to a separating furnace without exposure to air using gravity or other feed means. The product is first distilled to drive off mercury and thereafter, the residual material is heated to above 1500° F. to separate sodium chloride. Subsequent purification steps are suggested. Not only does the Glasser process require the use of inherently dangerous mercury and sodium, it is expensive, requires much equipment and multiple steps as well as proximity and access to caustic soda processing plants.

Other processes are described in Maddex, Pat. No. 2,556,763; Blue, Pat. No. 2,567,838; Winter, Jr., Pat. No. 2,586,134; Winter, Jr., Pat. No. 2,607,674; Winter, Jr., Pat. No. 2,621,121; Loonam, Pat. No. 2,694,653 and Dietz, Pat. No. 2,812,250.

Thus it is noted that the process of obtaining titanium metal from rutile ore by reduction thereof is well known. The conversion of the ore, which is in the form of an oxide, to the tetrachloride and reaction of the tetrachloride with magnesium metal to form magnesium chloride and titanium metal has been discussed. Titanium produced in this manner required considerable purification, both from impurities originating from the ore as well as removal of magnesium chloride trapped within the product and any remaining magnesium metal. Known processes often included electrolytic processes where the production of magnesium metal was electrolytic. Magnesium was produced electrolytically isolated, removed from the cell and purified. The purified magnesium metal then was remelted for the reduction reaction with the titanium tetrachloride. These processes were unduly expensive in terms of the energy requirements, the precautionary expedients required for safety (especially in view of the reactivity of magnesium and the need to separate and transfer same), the number of steps and cost of purification, the waste of raw materials and loss in both transfer and purification.

Of all the problems inherent in the conventional processes for reduction of titanium ore with magnesium metal, exposure of the magnesium metal to air was the most serious, particularly in terms of safety.

Conventionally, processes for producing titanium sponge include draining of the magnesium chloride from the reaction cell as the reduction reaction proceeds. The drained magnesium chloride is recycled by electrolysis producing magnesium metal, which is drawn from the cell and cast as ingots. These ingots then are placed in a steel retort and melted. The resulting molten magnesium is either transferred to another vessel for reaction with titanium tetrachloride or the molten magnesium charge reacted in the same vessel in which it was melted.

The reduction reaction of titanium tetrachloride with magnesium is exothermic, with the by-product, magnesium chloride, heated to about 1400° F. Thus the magnesium chloride is molten. Conventionally, the heat released in the exothermic reaction is lost, that is, not advantageously used.

Another problem encountered with conventional processes is the establishment of access both to the titanium metal produced, and to the magnesium chloride by-product. The reaction vessel conventionally has to be cooled. After cooling, operators using physical means such as jack-hammers or the like must literally break up the soldified material. The titanium metal resulting must be refined for obtaining the purity commercially desired. A further danger encountered is the production of harmful amounts of phosgene gas resulting from the reaction of impurities in the ore with chlorine produced, or with the magnesium chloride, under the elevated temperatures of the reactions.

The production of titanium metal is a very precise operation since the hot metal combines with oxygen, nitrogen and moisture of the air. The metal also combines with carbon and most construction metals. Refractory materials also are vulnerable to attack due to their oxygen content. Contaminants produced render the resulting metal so hard and brittle that it is useless for most applications. If once picked up, there appears to be an absence of practical methods for removing such impurities. If one carries out the reaction under an atmosphere of an inert gas, such as helium or argon at around 800° C., the titanium alloys with the iron in the vessel to a minimal extent. Nevertheless, the metal layer in contact with the vessel wall contains too much iron to meet specifications and must be discarded.

In operation under conventional processes, the magnesium ingots are pickled in dilute acid to remove surface oxidation followed by rinsing and drying steps. The dried magnesium charge is placed in a cylindrical flat-bottomed steel pot. The cover is welded in place, the vessel tested for leaks and, if no leaks are detected, all the air is removed from the vessel by evacuation, followed by release of the vacuum repeatedly with helium or argon. The vessel, with the magnesium charge, is placed in a vertical cylindrical furnace and heated either by electricity or by fuel combustion. As soon as the magnesium begins to melt, purified titanium tetrachloride is introduced at a carefully controlled rate. Inert gas pressure within the vessel is maintained to prevent inward air leakage. The rate of introduction of the titanium tetrachloride is controlled such that excess heat generated in the vessel is dissipated through the vessel walls, external heat being unnecessary to maintain the vessel temperature between 750° and 1000° C.

Accordingly, improvements are sought in the recovery and in the purification of the recovered product with reduction in the danger, lowering of the costs, especially energy costs, increase in product purity and access to the desired product.

The less handling the better and the less exposure of the reactants are important criteria to be met.

SUMMARY OF THE INVENTION

A system, including a single electrolytic/reaction cell, for obtaining titanium metal sponge from rutile ore by converting the rutile ore to titanium tetrachloride in a separate vessel and feeding the titanium tetrachloride to a combined electrolysis/reaction cell containing molten magnesium metal produced by electrolysis of magnesium chloride in that cell and reducing the titanium tetrachloride with the molten magnesium to produce titanium sponge and chlorine, diverting the produced chlorine to that vessel in which the titanium tetrachloride is produced and the molten magnesium chloride produced by the reduction reaction is retained for subsequent electrolysis in the same cell. Impurities in the ore are distilled from the reaction vessel in which the titanium tetrachloride is produced. Impurities in the titanium sponge are distilled therefrom.

DESCRIPTION OF PREFERRED EMBODIMENTS

As was noted hereinabove, the invention herein concerns a new and improved closed system for obtaining substantially pure titanium metal from its naturally abundant ores, such as Rutile ore. The system, and particularly the improved apparatus incorporated in said system, enables the production of titanium metal sponge of high purity with little loss of reactants employed and high efficiency of operation in its minimization of the use of energy, the invention being particularly characterized by the electrolysis the reduction steps being performed in a single vessel.

Figure 1:
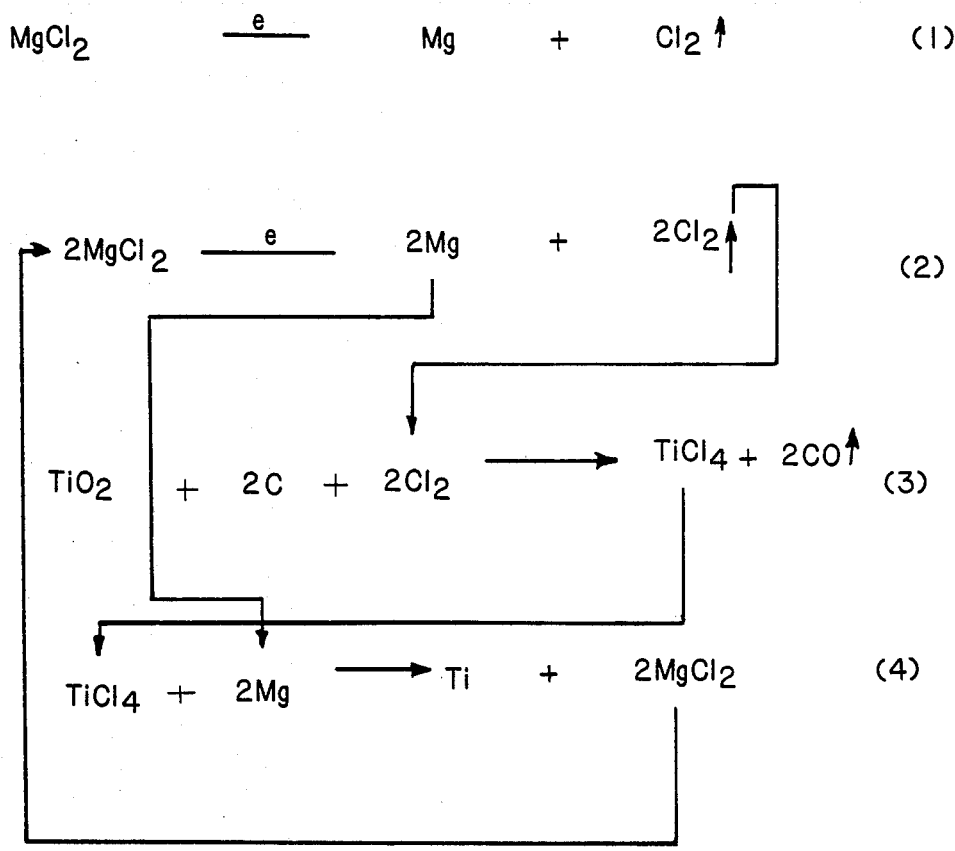
FIG. 1 is a diagrammatic chart showing the chemical reactions involved with the system according to the invention and the relationship of the reactants and products thereof.
Figure 2:
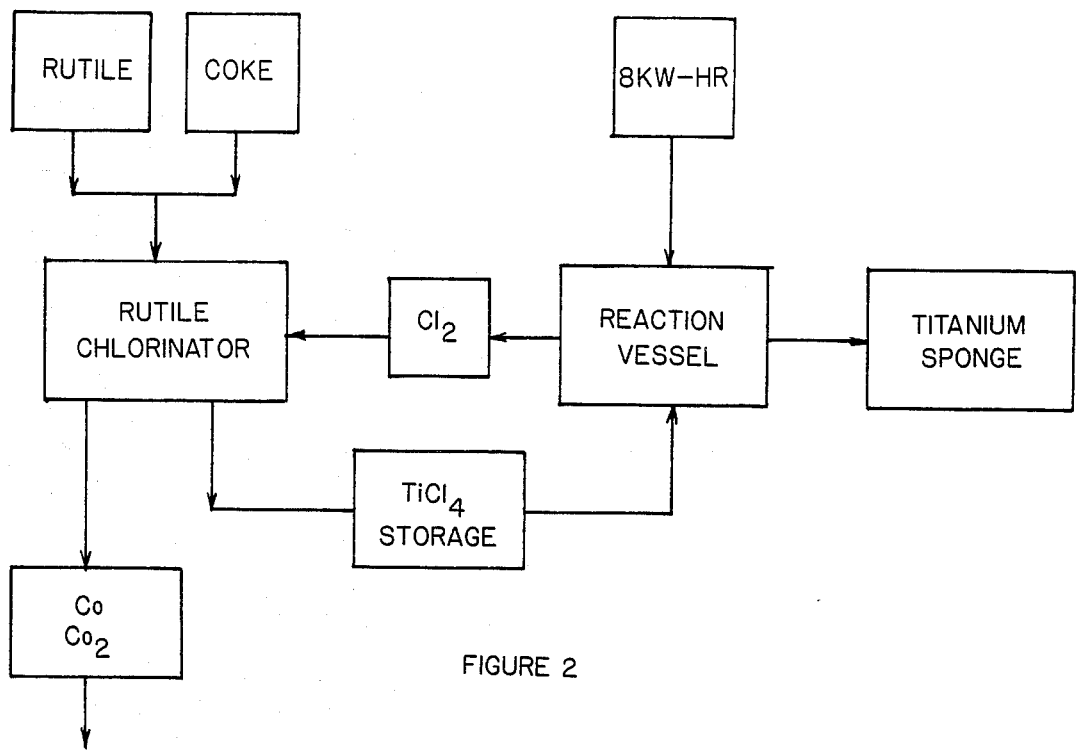
FIG. 2 is a flow diagram illustrating the system of obtaining titanium metal sponge of high purity from rutile ore according to the invention.

The basis chemical reactions employed in the system according to the invention are as illustrated in FIG. 1, the arrows therein illustrating the generation and recycling linkages.

Basically, magnesium chloride is electrolyzed to produce magnesium, which is employed as the reducing agent reacted with a titanium halide and chlorine gas. The chlorine gas is employed as a reactant with titanium ore and coke to form titanium tetrachloride, the reactive halide to be reduced by the magnesium formed by electrolysis above mentioned. One typical composition of Rutile Ore that is representative is set out in the following Table I.

TABLE I
RUTILE ORE
Australian

| TYPICAL CHEMICAL ANALYSIS | | |
|---|---|---|
| $TiO_2$ | 96.80% | Guaranteed 95% Minimum |
| $Fe_2O_3$ | 0.65 | |
| $ZrO_2$ | 0.96 | |
| $SiO_2$ | 0.65 | |
| $Cr_2O_3$ | 0.18 | |
| $V_2O_5$ | 0.51 | |
| $P_2O_5$ | 0.03 | |
| S | 0.01 | |
| $Al_2O_3$ | 0.22 | |
| CaO | 0.01 | |
| MgO | 0.06 | |
| PbO | 0.06 | |
| Ignition Loss | 0.15 | |
| TYPICAL SCREEN ANALYSIS (GRANULAR) | | |
| Plus 52 Mesh | 0.3 | |
| Plus 72 Mesh | 9.5 | |
| Plus 100 Mesh | 55.9 | |
| Plus 150 Mesh | 30.9 | |
| Plus 200 Mesh | 3.1 | |
| Pan | 0.3 | |

Granular, 200 mesh, 325 mesh and 400 mesh available from Cincinnati in bags.
Granular also available in bulk.

A mixture of coke (source of carbon) and said Rutile titanium ore is introduced into a vessel hereinafter referred to as a chlorinator, to which is added the chlorine gas produced during the electrolysis of magnesium chloride.

The magnesium produced in the electrolysis process is retained in the single electrolytic/reaction cell while the reaction between chlorine and the rutile ore/coke mixture takes place in the chlorinator. The product of chlorination, titanium tetrachloride, is returned to the electrolytic/reaction cell and reacted with the magnesium so as to produce titanium metal in sponge form and to replenish the supply of magnesium chloride in said electrolytic/reaction cell.

The temperature of the reaction is controlled to maintain a level sufficient to vaporize, for discharge, any impurities such as magnesium metal, magnesium oxide, trace elements, etc. which may have remained subsequent to the reduction reaction. Separate distillation may follow.

The major purification of the Rutile Ore occurs during the chlorination process, where the trace elements, including iron, silicon zirconium, aluminum, vanadium and others, mostly as oxides, are converted to their respective chlorides and are discharged from the chlorinator along with titanium tetrachloride. The discharged titanium chloride is distilled for purification purposes prior to entry into the electrolytic/reaction cell for reaction with the magnesium, said magnesium being retained within the electrolytic/reaction cell in which it is produced.

Referring to FIGS. 3 A, B, C and D as well as 4 A, B and C, there are illustrated electrolytic/reaction cells which characterize the invention herein as shown in the stages of the process. The electrolytic/reaction cell generally is designated by reference character 10 and comprises a steel cylindrical vessel or retort having a removable upper section 12 and a lower section 14. A steel open-topped product container 16 is disposed within the lower section 14. Container 16 is provided with a bottom or floor 18 and has plural drain openings 20 formed in the wall thereof closely adjacent to the floor 18.

Heating elements 22 are provided about the lower section 14. The upper section 12 of the cell 10 has a circumferential flange 24 adapted to be seated sealably secured to a like flange 26 on the lower section 14. The upper section 12 is fitted with a cover 28 sealably coupled thereto. Cover 28 has an axial passage 30 through which an elongate ceramic tube 32 is fitted. The tube 32 is selected of a length whereby it extends into the open top of the container 16 forming a sheath for the passage of the graphite rod 34 functioning as the anode.

Figure 4C:
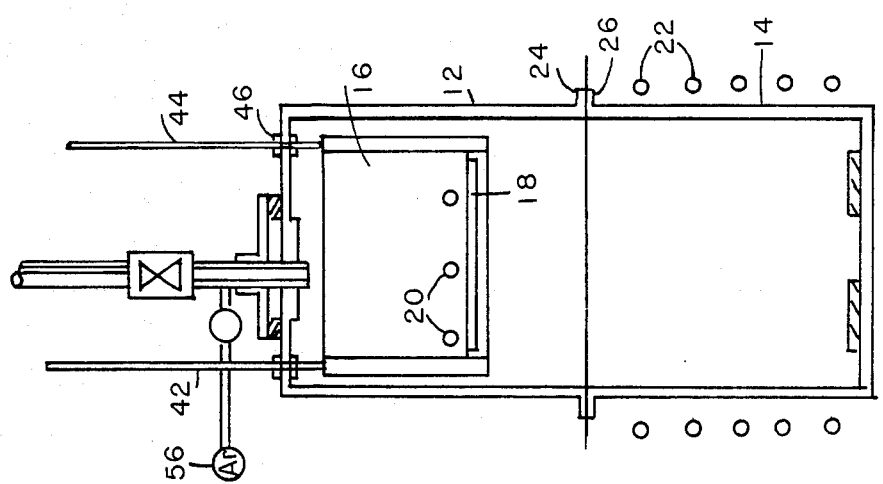
FIGS. 4 A, B and C are diagrammatic elevational views in section illustrating the combined electrolytic/- reaction cell in the respective stages of the system as shown in FIGS. 3 A, B, C and D.

The anode extends upwardly through the cover 28 and out of cap 36 sealably secured onto said cover 28 but insulated electrically therefrom by insulator 38. The cap 36 has an outlet port 40 which is capable of being coupled to conduits leading to the chlorinator (to be described). Lifting rods 42 and 44 are passed through the cover 28 by way of seal members 46. The lifting rods 42 and 44 are coupled by welding or otherwise to the rim of container 16 for lifting same into the section 12 when desired in the process, as shown in FIG. 4C.

Figures 3A, 3B, 3C, 3D:
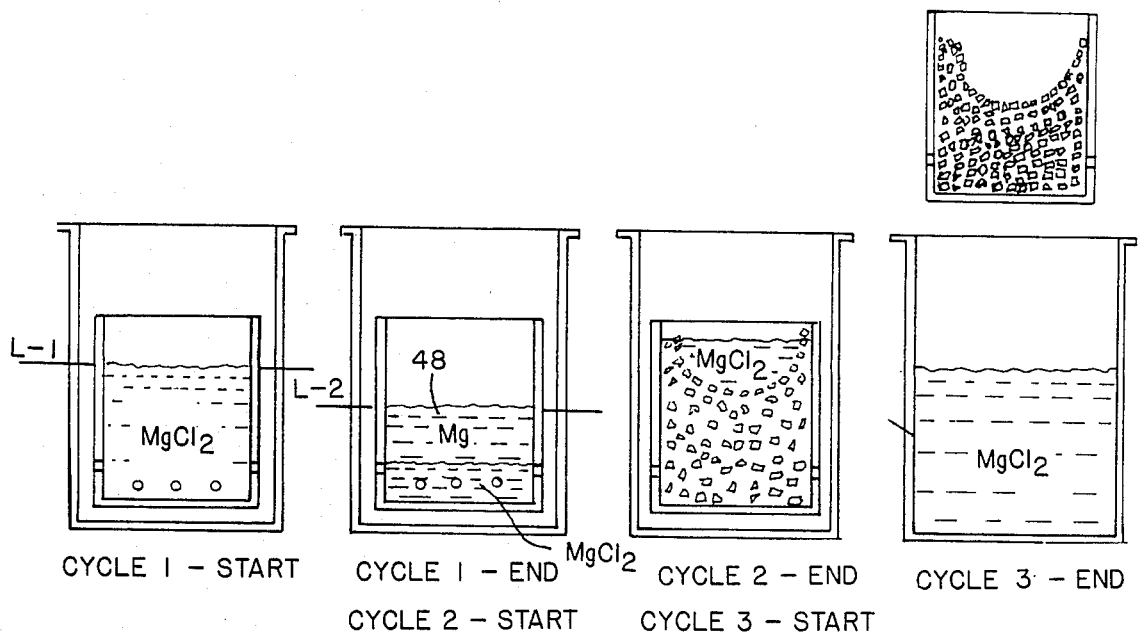
FIGS. 3 A, B, C and D are graphic representation as illustrating the stages in the process according to the invention.
Figure 4B:
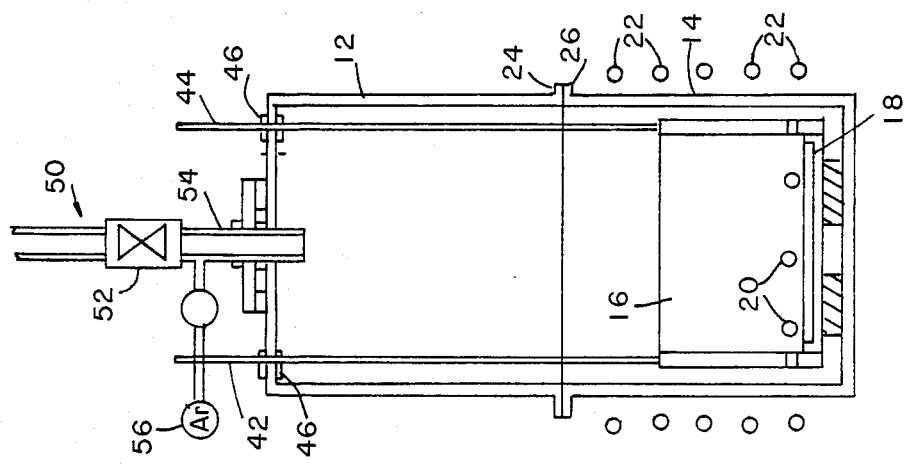
Figure 4A:
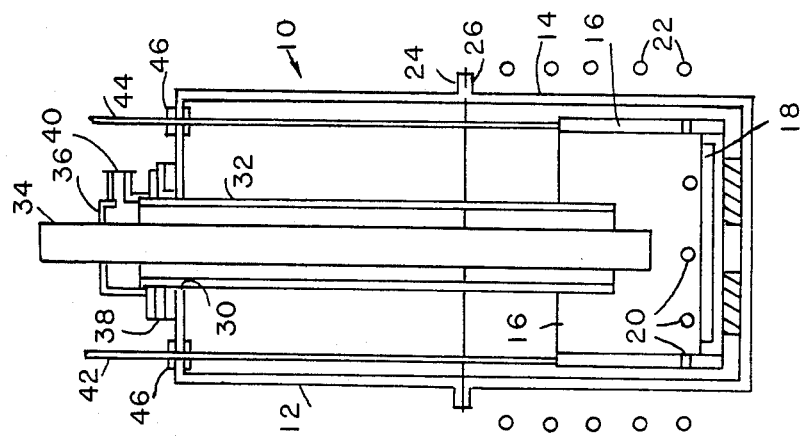

As shown in FIG. 3A where the electrolytic/reaction cell 10 is in a condition shown in FIG. 4A, a load of magnesium chloride is added to the lower section 14 of the cell 10. The section 14 is heated to about 1350° F. to melt the magnesium chloride. The level of the liquid magnesium chloride is brought to a level L-1 in the container 16. The upper section 12 with the associated anode 34 is seated onto the lower section 14 and bolted in place. A D.C. voltage at high amperage is supplied between the graphite anode 34 and the steel container 16 and the molten magnesium chloride is subjected to electrolysis to produce chlorine deposited at the anode 34 and magnesium metal. The chlorine gas is trapped within the tube 32 which surrounds said electrode 34 and is discharged by way of said port 40 to conduit means leading to the chlorinator.

The magnesium metal produced during the electrolysis process deposits on the surface of the container 16 (cathode) and rises upward through the molten magnesium chloride toward the surface thereof. The tube 32 which vents the chlorine gas further serves as an electrical insulator to prevent the magnesium metal, represented by reference character 48, which will float on the surface of the magnesium chloride, from short circuiting the electrolytic/reaction cell 10.

In the first cycle of operation, the electrolytic/reaction cell 10 functions as an electrolytic cell for production of the magnesium metal, which is used as the reducing agent, and the chlorine gas for delivery to the chlorinator. At a current efficiency of about 80%, approximately 8 kilowatt hours of power is required to produce one pound of magnesium. The same amount of power, of course, produces three pounds of chlorine gas which leaves the cell 10.

FIGS. 3 (A, B, C and D) illustrate diagrammatically the stages of the process while the representations of FIGS. 4A, 4B and 4C illustrate the condition of the cell 10 at those stages respectively. FIGS. 3A and 4A diagrammatically illustrate the cell 10 at the initial stage of the process just prior to the initiation of the electrolysis procedure. The first cycle consists of the electrolysis and the level L-1 of the molten magnesium chloride is represented. At the end of the first cycle, the total liquid level L-2 is lower than the level L-1 at the start of the electrolysis. This change in level results from the loss of three pounds of chlorine leaving the cell 10 for each pound of magnesium produced. Particular attention thus is directed to FIG. 3B illustrating the floating magnesium metal 48 upon magnesium chloride remaining in the container 16.

The second stage or cycle in the process is initiated when there is sufficient floating magnesium metal to reach the bottom of the refractory tube 32 illustrated in FIG. 4A. At this time, the center electrode 34 is withdrawn along with its surrounding refractory tube 32. If plural electrolysis/reaction cells 10 are employed, the assembly of the anode 34 and its surrounding tube 32 is installed in a second electrolysis/reaction cell and electrolysis initiated within that second cell 10. As illustrated in FIG. 4B, a feed system 50 including valve 52 and piping 54 is coupled to the upper section 12 of cell 10 in substitution for the electrode assembly just removed. The feed system 50 links the supply of titanium tetrachloride to said section 12 of cell 10. The valve 52 is opened and titanium tetrachloride is introduced into the cell 10 to drop upon the open bed of floating magnesium metal in the container 16. An inert gas, such as argon from a source 56 thereof may be employed as a flushant during the feeding process by which titanium tetrachloride is introduced. Titanium metal is produced by reaction with the magnesium metal as shown in FIG. 3C, the cell 10 being illustrated in this reduction reaction stage in FIG. 4B. Thus, after the reduction reaction is completed, by which titanium metal and magnesium chloride is produced, the third stage or cycle is initiated, flow of titanium tetrachloride being terminated. For each pound of magnesium metal in the cell 10 at the start of the second cycle, four pounds of titanium tetrachloride is added to produce one pound of titanium and four pounds of magnesium chloride. The greater amount of the magnesium chloride remaining at the end of the reduction reaction floats upon the body of titanium metal (produced in sponge form). Upon completion of said reduction reaction, the container 16 is raised within the lower section 14 to the upper section 12 of cell 10 without exposing the cell interior to air, to enable drainage of the magnesium chloride and cooling of the remainent body primarily of titanium metal sponge.

Once the titanium metal has cooled at least below 800° F. and preferably to reach a temperature in the vicinity of 600° F., the cell 10 can be opened. The container 16 with its primarily titanium content can be removed. The titanium metal is not reactive at such temperature and hence the container 16 and the titanium metal therein can be removed bodily and placed within a vacuum chamber (not shown) and heated to 1850° F. to boil off any entrapped magnesium chloride, as well as any remaining magnesium metal or magnesium oxide that may have been entrapped therewithin. Conventional cold traps (not shown) may be provided for coupling to the vacuum chamber for receipt and condensation of the gaseous magnesium chloride, magnesium metal and magnesium oxide fractions for recovery and recycling back to the process.

Figure 7:
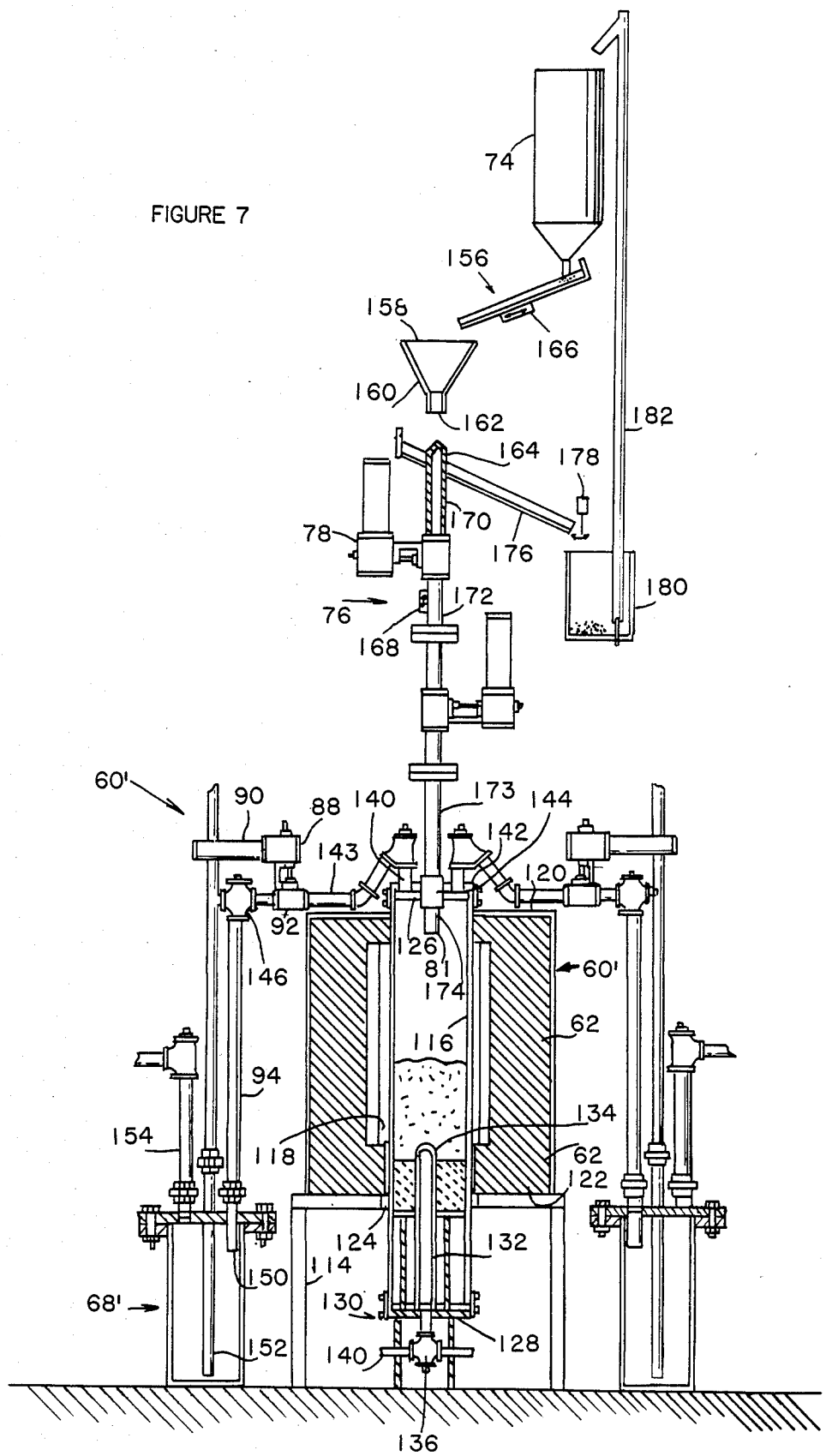
FIG. 7 is a diagrammatic elevational sectional representation of a chlorinator as employed in the systems of FIGS. 5 and 6.

The chlorinator is illustrated in FIG. 7 wherein the chlorine produced in the cell 10 by electrolysis of chloride is recycled to prepare titanium tetrachloride. The chlorinator, designated generally by reference 60, operates at about 1650° F. and is raised to such temperature externally, as by the furnace 62 surrounding same. Once the reaction,

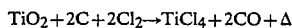

$$TiO_2 + 2C + 2Cl_2 \rightarrow TiCl_4 + 2CO + \Delta$$

is initiated, no further external heat is required since the said reaction is exothermic. Either pressure transfer system 64 or a gravity transfer system 66 is coupled to the chlorinator 60 to transfer the titanium tetrachloride produced therein to a specific location for introduction to the cell 10.

Figure 5:
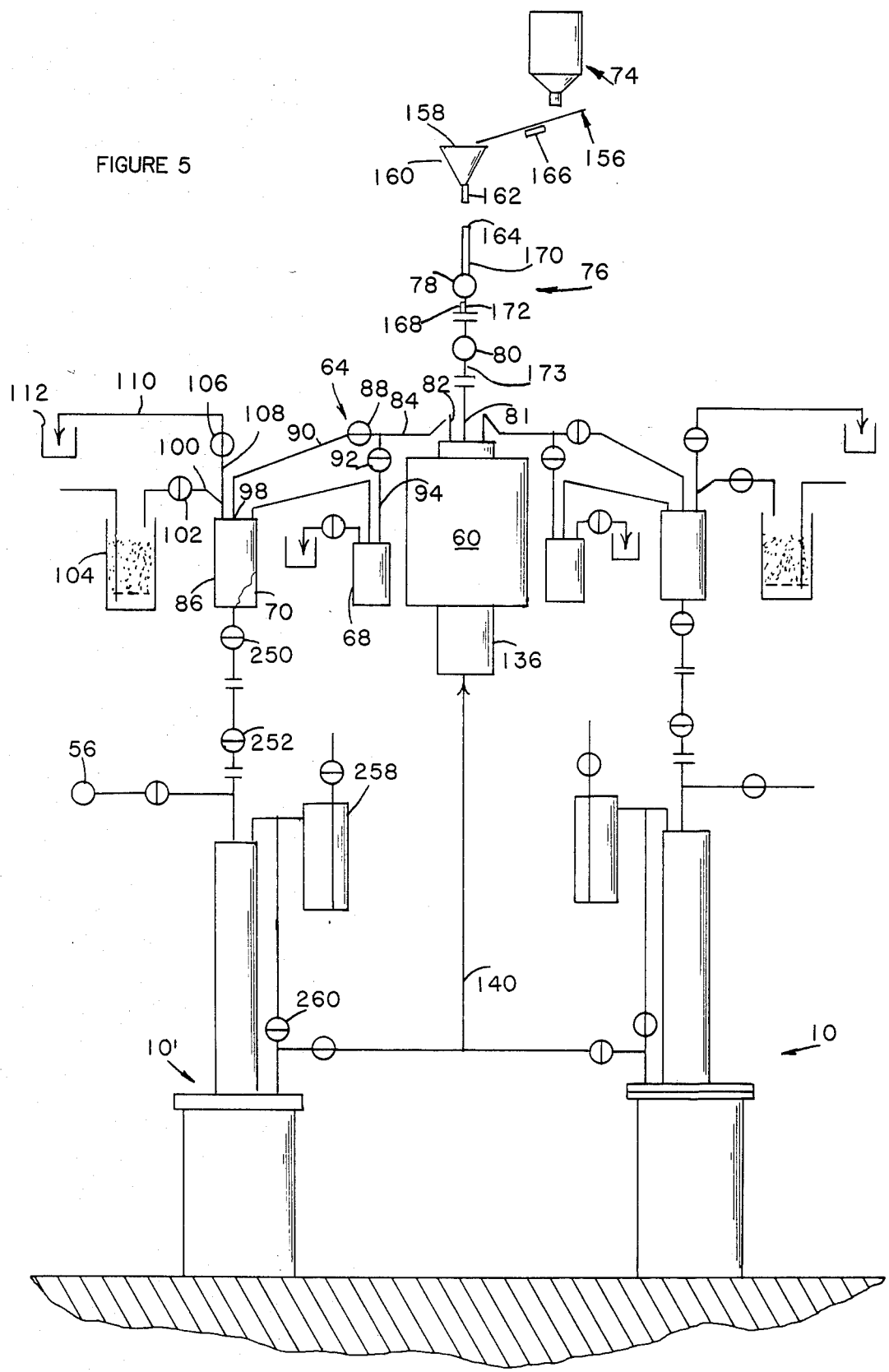
FIG. 5 is a diagrammatic representation of one system according to the invention for obtaining titanium metal sponge.
Figure 6:
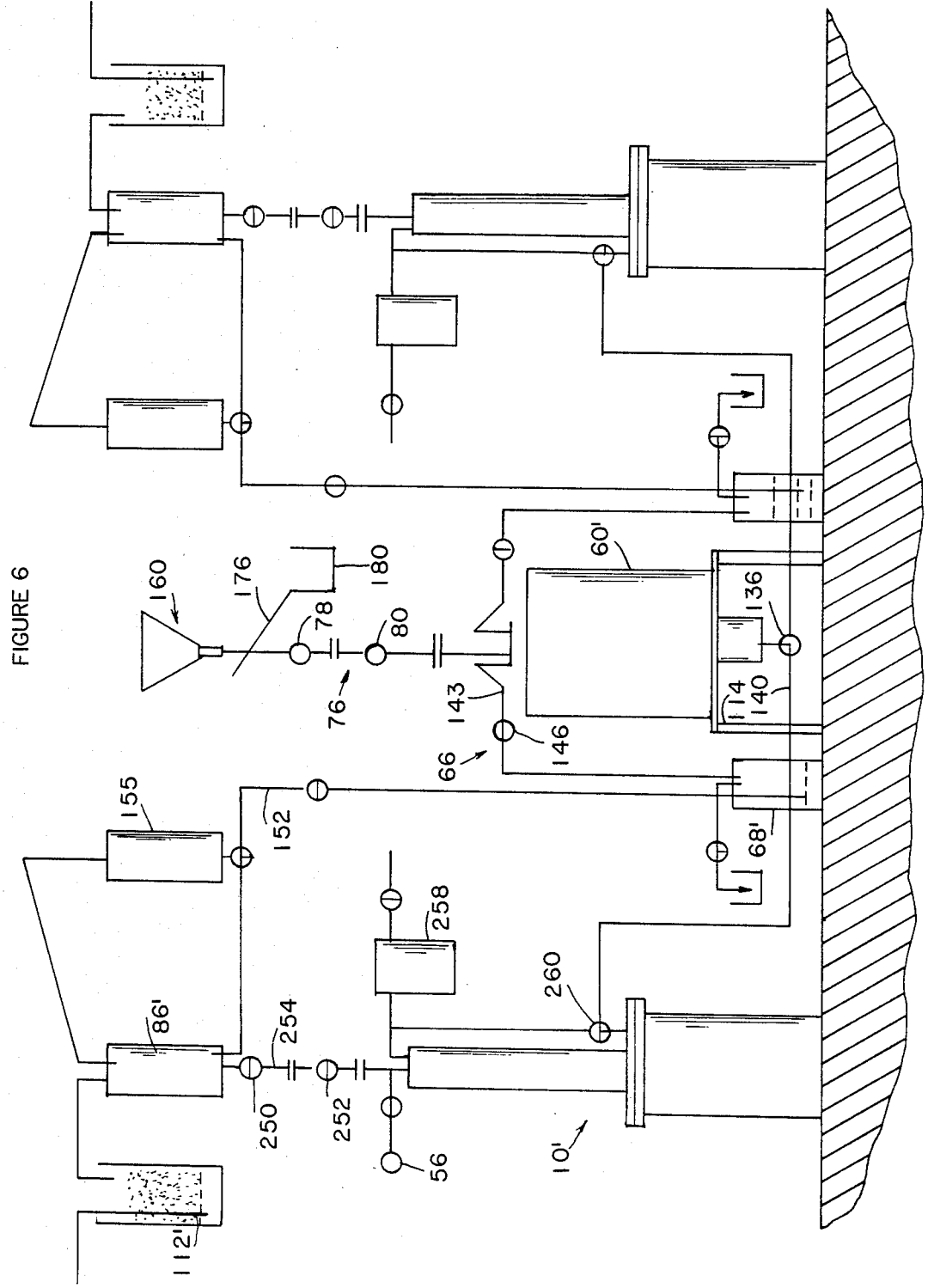
FIG. 6 is a diagrammatic representation similar to that of FIG. 5 but illustrating a modified system.

In FIG. 5 the gravity transfer system 66 for the titanium tetrachloride is illustrated while FIG. 6 illustrates a pressure transfer system 64 substituted in the system. The gravity transfer system 66 is simpler than the pressure transfer system, containing many more valves and containers. However, where the sites of installation have relatively low roofs, there is a height limitation making use of a pressure transfer system imperative.

Referring to FIG. 5, a representation of an exemplary system is provided wherein there are a pair of cells 10 and 10' used alternatively. Cell 10 has just completed the electrolysis of magnesium chloride and contains two pounds of magnesium in its product container. Cell 10' is at ready, with the magnesium chloride therein molten. At the moment electrolysis was completed in cell 10, power is switched from cell 10 to 10' to initiate electrolysis therein.

Referring also to FIGS. 5, 6 and 7, illustrating more details of the system, including chlorinators 60 and 60', the titanium ore is mixed with carbon in the form of coke in mixer/feed hopper 74 and directed through a feed system 76 including valves 78 and 80 to the inlet 81 at the top of the chlorinator 60. Lines 82 and 84 (143 in FIG. 7) carry the titanium tetrachloride produced in the chlorinator 60 respectively to a receiving tank 86 via valve 88 and line 90 or to a purifier such as a distillation still 68 via valve 92 and line 94. The line 94 enters the storage/feed tank 96 at inlet 98. The tank 86 is vented by way of line 100 via valves 102 to dryer 104 which includes a bed of calcium chloride. Valve 106 controls passage through lines 108 and 110 to an exhaust 112 which may include a scrubber to prevent undesirable components from escaping to the atmosphere.

The purifier or still 68 is illustrated positioned intermediate the chlorinator 60 and the cell 10. Although a more pure titanium tetrachloride can be produced using the still 68, the distillation step performed thereby may not be needed.

In the chlorinator 60, the ferric oxide is converted to ferric chloride, which is nonsoluble in titanium tetrachloride and remains as a brown solid in the bottom of the titanium tetrachloride container. Zirconium oxide is converted to zirconium tetrachloride, same being a white solid which deposits on the condensor tubes of the still and/or on the wall 70 of the titanium tetrachloride storage container 86.

The zirconium tetrachloride does tend to clog the system and must be cleaned out periodically. Since zirconium tetrachloride is soluble in water, periodic flushing with water will remove same. The silicon dioxide in the ore is converted to silicon tetrachloride, which melts at $-70°$ C. and boils at 57° C. Silicon tetrachloride and titanium tetrachloride are fully soluble in each other and hence the silicon in the ore will be carried over into the titanium metal produced unless remedial action is taken.

Titanium tetrachloride boils at 136° C. while the boiling point of silicon tetrachloride is 57° C. The container 86 for storing titanium tetrachloride should be maintained above 57° C., preferably at 70° C. Under such temperature condition, the silicon tetrachloride produced in the chlorinator 60 will not condense in the titanium tetrachloride chamber container but will continue to and through the exhaust system. Vanadium oxide in the ore is converted to vanadium tetrachloride (boiling at 152° C.) and is carried over into the titanium produced. Vanadium is not an objectionable impurity and hence even if vanadium is carried over into the titanium product, it is not a serious problem.

In FIG. 6 the same basic system components as in FIG. 5 are provided but the system is pressurized and the feed from the chlorinator 60 to the titanium tetrachloride storage tank 86' is a pressurized feed. The chlorinator 60 is supported on support structure 114 at ground level, with still 68' seated at ground level. The titanium tetrachloride produced in the chlorinator 60 is pumped upwards to the storage tank 86' from the chlorinator 60 by way of the still 68' and from there, to the storage tank 86' located substantially above the electrolysis/reaction vessel or cell 10.

Looking at FIG. 7, the chlorinator 60 comprises an inner core 116 formed of refractory tubing seated in through passage 118 formed in surrounding electric furnaces 62 and extending outward from the top 120 and floor 122 of said furnace 62 through a passage 124 formed in support 114. The opposite ends of the core 116 are capped and sealed by upper cap 126 and lower cap 128. Lower cap 128 includes the chlorine injection system 130, including an injector 132 having an outlet 134 and an inlet 136 extending outward of the cap 128. Inlet 136 is coupled into line 140 leading from the electrolysis/reaction cell 10.

The upper cap 126 accommodates a pair of outlet ports 140 and piping 142, and a centrally located inlet port 144. One of the outlet pipes 142 is coupled through fail-safe pneumatic ball valve 146 to line 94 leading to the still inlet 150. Outlet line 152 extending from the vicinity of the floor of the still 68' is directed to the receiving tank 86 while line 154 is directed to the scrubber/exhaust 112'. The chlorinator 60 is illustrated as installed in the pressure feed system of FIG. 6. An intermediate second still 155 can be interposed in the line 152 leading to the storage tanks 86 or 86' from which titanium tetrachloride is fed to the electrolysis/reaction cell 10.

The ore/coke feed system 76 preferably is a gravity/mechanically augmented system and comprises a cylindrical mixer/hopper 74 positioned with its outlet above inclined ramp or belt arrangement 156 leading to the inlet 158 of chute 160, the outlet 162 of which is positioned to feed tube inlet 164. Electrical vibrators 166 and 168 are arranged operative upon the belt arrangement 156 and upon the upper portion of feed tube 164 to assure continuity of feed of the ore/coke mixture. The feed tube is formed of sections 170 and 172 coupled together and includes the pair of valves 78 and 80 which can be described as fail-safe valves. The bottom section 174 terminates at 81 interior of the upper end of the refractory (ceramic) tube 116 of the chlorinator 60'.

The method of feeding the Rutile ore/coke mixture to the chlorinator is similar to the method of feeding the titanium tetrachloride to the electrolysis/reaction vessel, although a very flowable sand-like mixture is treated. The conventional ball valve used to control feeds cannot close well enough when full of such sand-like mixture. Accordingly, vibrator 166 operates to fill a section 170 of the feed pipe above the ball valves. This section 170, as shown, cannot be over-filled. It has a volume which is less than the volume in the pipe section between the two valves, 78 and 80. Once this upper section 170 of the feed pipe is filled, material overflows to ramp 176 and activates an overflow detector 178 which stops the feeding mechanism. Valve 78 then opens and drops the unit charge into the pipe section 170 between valves 78 and 80. Valve 78 then closes and valve 80 opens and drops the charge into the chlorinator 60' below by way of the remaining pipe 173. By allowing for the upper pipe section 170 to have a volume less than the volume between the two valves, a valve is never required to close when filled with the ore/coke mix. Of course, the feed rate is governed by the volumes of the pipe and the cycle rate. Overflow collector 180 receives the ore/coke mixture overflow from ramp 176 and directs same back to hopper 74 via line 182.

Figure 8:
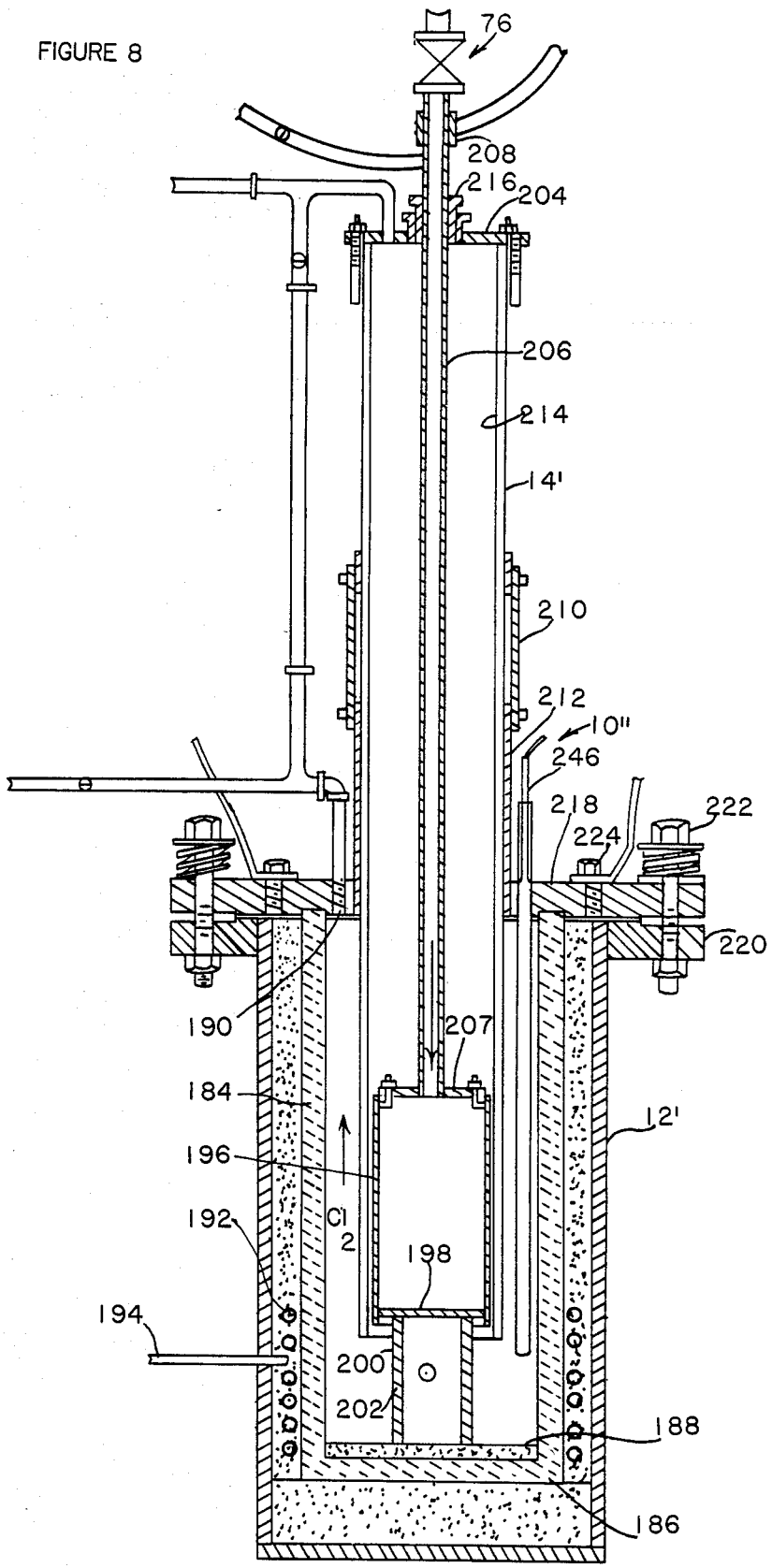
FIG. 8 is a diagrammatic elevational sectional representation of a modified electrolytic/reaction cell according to the invention.
Figure 9:
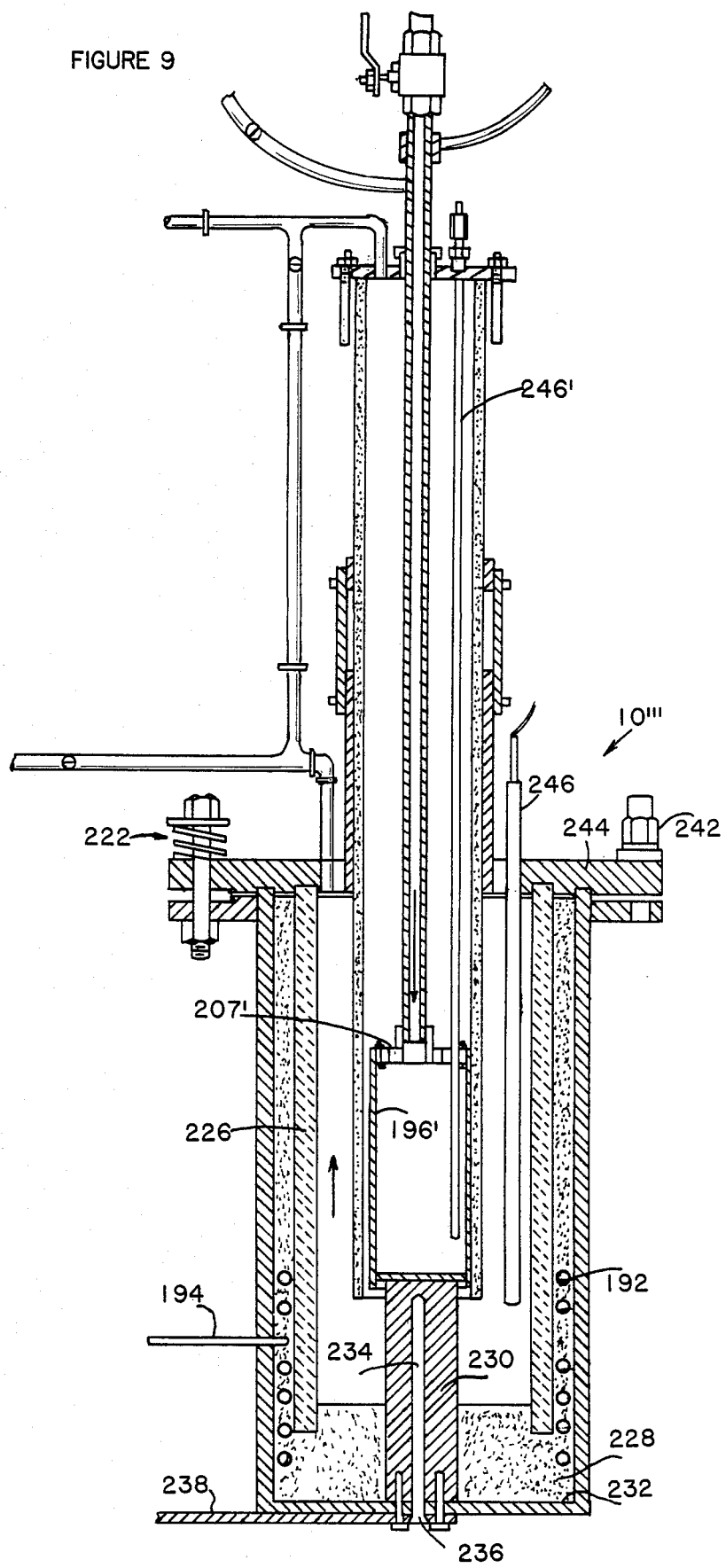
FIG. 9 is a diagrammatic elevational representation in section of a further modified electrolytic/reaction cell according to the invention.

Two modified embodiments of the invention are illustrated in FIGS. 8 and 9. These cell embodiments 10'' and 10''' differ from the earlier apparatus primarily in that the positions of the cathode and anode have been reversed, the anode now being the outer shell of the cell formed by a graphite crucible 184. This electrode must be formed by a machining process from electrode grade graphite rather than as ordinary graphite crucibles (which are formed primarily of clay graphite).

One here exchanges the relative positions of the anode and the cathode in the electrolysis/reaction cell 10 so that completion of the electrolysis process is permitted with the reduction reaction producing titanium then not only proceeding within the same vessel but without changing tops on the cell. With this arrangement, there is less opportunity for air to enter the system. Accordingly, the titanium thus produced will have lower oxygen content.

The bottom 186 of the graphite crucible 184 is covered with a disc 188 of refractory material simultaneously functioning as an electric insulator and to prevent the formation of chlorine gas along the bottom 186. Chlorine is formed along the sides of the graphite crucible 184 (the anode) and rises to the surface of the molten magnesium chloride, exiting through the top 190, as shown. Magnesium is released at the cathode, floats as a liquid body to the surface and is contained within the tube 214. Heaters 192 are provided for heating the outer surface of the crucible 184. Thermocouple 194 is provided for monitoring the temperature.

Magnesium chloride is heated by heaters 192 provided on the outer surface of the graphite crucible 184, with the addition of magnesium chloride continuing until the cell is filled to a level.

For electrolysis a 7 volt D.C. voltage at 3000 Amps is directed from a source to the cell 10 to initiate the electrolysis. During the electrolysis process, chlorine gas is formed and deposited at the anode and leaves the cell, with the level within the cell being reduced to a level corresponding to L-2 in FIG. 3B. At this point in the process, most of the liquid in the container 16 is magnesium while all the liquid exterior of the product container is magnesium chloride. Some liquid in container 16 also will include some magnesium chloride since the container has openings in it which permit free passage of magnesium chloride through the container bottom. The liquid magnesium floats on top of the magnesium chloride. The electrolysis continues until a predetermined amount of magnesium is produced. The level L-2 shown in FIG. 3B represents containment of about two pounds of magnesium metal. In order to produce four pounds of magnesium, one would start with a level $L_2$ about twice as high as represented in level L-2 in FIG. 3B. Current requirements would be doubled, to 6000 Amps. The process would take about one hour to produce about four pounds of the reducing agent, magnesium. The container 196 is equivalent to container 16 in function but includes a perforate bottom 198 to which a depending cylinder 200 is secured, as by welding. Cylinder 200 is provided with drain passages 202. The tube 214 is covered with disc 204 carrying elongate vertical tube 206, electrical connection being made thereto at 208.

The cell section 14' is formed by joining a pair of pipes 210, 212 together defining a sheath for tube 214. Tube 214 has a cap 216 through which tube 206 passes.

The feed system 76 is coupled to the upper end of tube 206. Tube 206 serves as the cathode and as a conduit for feeding titanium tetrachloride to the magnesium once electrolysis is complete. The magnesium chloride formed during the reduction reaction is drained through perforate bottom 198 and drain passages 202 remaining in the crucible 184. Tube 206 is weldably secured to perforate container cap 207.

The lower section 12' of cell 10'' carries a cap 218 bolted to flange 220 by spring biased bolts 222. The upper end of crucible 184 is secured in engagement with the cap 218 and electrical connection is made via the cap 218 by connector 224.

Once the reduction reaction is complete, the container 196 is raised within tube 214 for draining any magnesium chloride from the container 196.

In FIG. 9 there is illustrated a further modified embodiment of the invention generally designated by reference character 10''' and is similar to cell 10'' except that the anode comprises a graphite tube 226 positioned to replace the graphite crucible 184 which functioned as the anode in the embodiment illustrated in FIG. 8. The tube 226 is seated in a refractory bed 228.

The cathode is formed as a cylindrical rod 230 located secured to the floor 232 of the lower section 14'' with an axial interior Calrod heating element 234. Electrical connection 236 is made to a heavy copper buss bar 238. The power input 240 is coupled to one of the flange bolts 242 with the cover 244 being insulated electrically from the cell 10'''. A second thermocouple 246' may be introduced to the container 196'. Tube 206 may be threadably connected to cap 207'. Otherwise, the constructions of the electrolysis/reaction cells are similar.

In both FIGS. 5 and 6 the systems illustrated contain two reaction cells connected to one chlorinator 60 or 60'. Three reaction cells can be grouped around one chlorinator at 120° spacing. Two of the cells could be cycled while the third was down for maintenance, i.e., cleaning, etc. By this method, a continuous process is obtained. One power supply is needed, and this supply operates continuously, producing magnesium and chlorine. The production of titanium in a cell would continue until the product container is reasonably full. The production rate of the system is governed by the amount of power supplied to it.

The titanium sponge is purified of any adhering $MgCl_2$ and magnesium metal by the conventional method of heating to 1750°–1800° in a vacuum. At this temperature in a vacuum, both $MgCl_2$ and magnesium boil off. They are recovered and added back to the cells, as discussed earlier.

All valves employed in the system of FIGS. 5 and 6 are of the pneumatic, fail-safe design. The valves open with air pressure and are closed with a spring. Thus, if air pressure or electricity fail, the valves close. The valves are of all stainless steel parts with Teflon seals. This type of valve has been found to be satisfactory to handle titanium tetrachloride ($TiCl_4$) as a liquid or a gas, and is also suitable for chlorine gas.

Looking back at FIGS. 5 and 6, the cell 10' is shown after completion of the electrolysis cycle and during a flush cycle prior to the introduction of $TiCl_4$. At the end of the flush cycle, valve 250 and valve 252 will close. All other valves will remain as described. To introduce the $TiCl_4$, first valve 250 is opened for a short period. This allows $TiCl_4$ to fill the pipe section 254 between valve 250 and valve 252. Then valve 250 is closed. With valve 250 closed, valve 252 is opened. This allows the $TiCl_4$ between the two valves to drop into the cell below and thus onto the surface of the molten magnesium. The $TiCl_4$ reacts with the magnesium. Valve 252 then is closed. Valve 250 again is opened for a short period and then closed to allow the section of pipe between the two valves to fill with $TiCl_4$ again. Once valve 250 closes (again), valve 252 may be opened to allow another charge of $TiCl_4$ to enter the cell below. Thus $TiCl_4$ may be added to the cell below at a controlled rate. The rate is determined by the volume of the pipe section between valves 250 and valve 252, and by the rate at which the valves are cycled. To determine a reasonable rate to feed the titanium tetrachloride ($TiCl_4$), thermocouple 246 is enclosed and monitored. The temperature within the lower section of the cell 10, 10', 10'' and 10''' should be kept below 1500° F.

In the event of a malfunction in the cycling of valves 250 and 252, causing both valves to be open at the same time, then the cell 10 below would explode. For this reason, the cell cover 244 is held on by spring biased bolts 242. This method of securement serves two functions: (1) A pressure buildup within the cell 10 will raise the entire head to relieve such pressure. Thus the spring hold-down 242 acts as a safety valve; (2) the spring hold-down 242 also acts to assure good electrical contact between the cell top 244 and the graphite crucible 184 inside. Without this spring pressure, the outer steel shell of the cell 10'' and 10''' would expand in length during heatup. This increase in length would lead to poor contact between the cell top 244 and graphite crucible 184. Since the system must carry 6000 amps, good contact must be maintained.

An expansion chamber 258 is provided with valve 260. Valve 260 remains open while titanium tetrachloride is being added to the cell 10'' or 10'''. Its function is to equalize pressure between the area above the molten magnesium within the container 16 and the area above the molten magnesium chloride in the graphite crucible 184.

When a unit charge of titanium tetrachloride is dropped from valve 252 on the surface of the molten magnesium, there is a pressure surge. Of course, much happens in a very short time during this part of the cycle. First, the titanium tetrachloride changes state from liquid to gas due to the high temperature, but at the same time, it is reacting (either as a liquid or a gas) to form solid titanium sponge, and liquid magnesium chloride. One observes a sharp pressure surge rapidly decreasing to normal, and an increase in the bath temperature. The pressure surge could cause a problem within the cell. If not compensated for by connecting the inner and outer sections of the cell with valve 260 the pressure surge could force the level of magnesium down in the container 16. This would force some of the magnesium out through the bottom of the container 16 and into the outer cell chamber. Magnesium thus forced out would be lost to the process. It would be recovered, however, when the cell was operated electrolytically, since the chlorine produced would react with it to form magnesium chloride. Thus the cell would "clean" itself in the event this occurred.

The large volume expansion chamber 258 helps dampen the pressure surge. One additional feature has been incorporated to help handle a pressure surge, if such a surge becomes a problem. The refractory tube can be lowered from the position shown in FIGS. 8 or 9 to the bottom of the cell. This can be done prior to the addition of titanium tetrachloride. The container 196 would remain in the position shown. By relocating the refractory tube in this manner, it would be very difficult for magnesium to be forced out of the reaction zone by a pressure surge.

According to the invention herein, it is possible to retain all of the reactive components of the process within the closed system, with the only transfer of material being chlorine out of the cell or retort to and through the chlorinator and back to the retort. Thus chlorine is not consumed but merely serves as a carrier for titanium.

It should be understood that the single combined electrolytic/reaction cell concept of the invention provides substantial savings in energy as compared to the energy requirements of the various prior art reduction processes using magnesium metal. The magnesium, employed as the reducing agent in the process provided by the invention, is only melted once, that is, when it is formed by electrolysis. Likewise, the magnesium chloride is in the molten state due to the fact that the reduction reaction of titanium tetrachloride is exothermic. The magnesium chloride produced is obtained at temperature levels of about 1400° F. and can be subjected to electrolysis in its molten state.

Conventionally, the electrolysis proceeds to production of magnesium metal, which is drawn off and cast as ingots. This requires placement of the magnesium ingot in a steel retort and melting since the reaction of titanium tetrachloride with magnesium requires the magnesium to be liquid.

Variations and modifications may be made to the structures which are illustrated as preferred embodiments without departing from the spirit or scope of the invention as defined in the appended claims.

What I claim is:

1. A process for producing titanium metal sponge in a stepwise operation within a closed cell system comprising the steps of:
   A. electrolytically decomposing molten magnesium chloride into magnesium metal and chlorine gas within a closed cell to form said magnesium metal as a molten layer upon said magnesium chloride;
   B. terminating said electrolytic decomposition, and subsequently;
   C. directly contacting titanium tetrachloride with said layer of magnesium metal for effecting a reduction reaction therebetween within the same closed cell to form titanium metal sponge and magnesium chloride; and
   D. removing said titanium metal sponge from said closed cell.

2. The process as claimed in claim 1, further comprising the step of removing from said closed cell without exposure thereof an electrolytic anode employed in said electrolytic decomposition subsequent to said termination of said electrolytic decomposition and prior to said contacting of titanium tetrachloride with said magnesium metal.

3. The process as claimed in claim 1, further comprising the step of depositing said titanium metal sponge in a container within said same closed cell and raising said container within said closed cell in order to enable drainage of any magnesium chloride from said titanium metal sponge again without exposure of said closed cell interior to air, prior to said removal of titanium metal sponge from said closed cell.

4. The process as claimed in claim 3, further comprising the step of cooling said titanium metal sponge within said container and again without exposure of said closed cell interior to air, prior to said removal of titanium metal sponge from said closed cell.

5. The process as claimed in claim 1 further comprising the step of gravitationally separating the titanium metal sponge from the magnesium chloride subsequent to completion of said reduction reaction.

6. The process as claimed in claim 1 comprising the step of directing the chlorine gas produced as a by-product of said electrolytic decomposition to react with a titanium ore/coke mixture under suitable conditions in a separate chlorinating apparatus to form the titanium tetrachloride employed to effect said reduction reaction and directing the thus produced titanium tetrachloride to said closed cell.

7. The process as claimed in claim 6, further comprising the step of removing from said closed cell without exposure thereof an electrolytic anode employed in said electrolytic decomposition subsequent to said termination of said electrolytic decomposition and prior to said contacting of titanium tetrachloride with said magnesium metal.

8. The process as claimed in claim 6, further comprising the step of depositing said titanium metal sponge in a container within said same closed cell and raising said container within said closed cell in order to enable drainage of any magnesium chloride from said titanium metal sponge again without exposure of said closed cell interior to air, prior to said removal of titanium metal sponge from said closed cell.

9. The process as claimed in claim 6, further comprising the step of cooling said titanium metal sponge within said container and again without exposure of said closed cell interior to air, prior to said removal of titanium metal sponge from said closed cell.

10. The process as claimed in claim 6, further comprising the step of gravitationally separating the titanium metal sponge from the magnesium chloride subsequent to completion of said reduction reaction.

* * * * *